(12) United States Patent
Yamakawa et al.

(10) Patent No.: US 6,985,312 B2
(45) Date of Patent: Jan. 10, 2006

(54) LENS MOUNTING DEVICE

(75) Inventors: Takeshi Yamakawa, Kanagawa (JP); Rumiko Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 4 days.

(21) Appl. No.: 10/792,807

(22) Filed: Mar. 5, 2004

(65) Prior Publication Data
US 2004/0240083 A1   Dec. 2, 2004

(30) Foreign Application Priority Data
Mar. 14, 2003   (JP) .............................. 2003-069025

(51) Int. Cl.
*G02B 7/02* (2006.01)
*G02B 26/08* (2006.01)
*B41J 27/00* (2006.01)

(52) U.S. Cl. .................. 359/819; 359/811; 359/820; 359/206; 359/513; 347/258; 269/40

(58) Field of Classification Search ................ 359/819, 359/811, 820, 205, 206, 207, 513; 351/163, 351/159; 399/75, 167, 297; 347/258, 238, 347/130; 358/480; 269/40
See application file for complete search history.

(56) References Cited

U.S. PATENT DOCUMENTS

| 4,697,918 A * | 10/1987 | Kogane ........................ 355/27 |
| 4,996,561 A | 2/1991 | Yoshimura et al. ......... 399/107 |
| 5,019,867 A | 5/1991 | Yamakawa et al. ......... 399/119 |
| 5,197,719 A * | 3/1993 | Kimura ........................ 269/40 |
| 5,379,155 A * | 1/1995 | Goetschmann et al. ..... 359/820 |
| 5,382,129 A | 1/1995 | Shimizu et al. ............. 414/411 |
| 5,499,107 A * | 3/1996 | Kuroda ........................ 347/258 |
| 5,526,193 A * | 6/1996 | Anzai ........................... 359/819 |
| 5,587,813 A | 12/1996 | Yamazaki et al. ........... 358/500 |
| 5,598,279 A | 1/1997 | Ishii et al. .................... 358/402 |
| 5,610,651 A | 3/1997 | Yamakawa et al. ......... 347/250 |
| 5,803,622 A | 9/1998 | Mama et al. ................... 399/4 |
| 6,072,516 A | 6/2000 | Yamakawa ................... 347/233 |
| 6,236,418 B1 | 5/2001 | Yamakawa ................... 347/263 |
| 6,243,128 B1 | 6/2001 | Yamakawa ................... 347/263 |
| 6,304,383 B1 * | 10/2001 | DeBoynton et al. ........ 359/579 |
| 6,560,433 B1 | 5/2003 | Yamakama ................... 399/129 |
| 6,603,612 B2 * | 8/2003 | Nakano ........................ 359/819 |
| 6,693,751 B2 * | 2/2004 | Morii et al. .................. 359/819 |
| 6,695,775 B2 * | 2/2004 | Watanabe et al. ........... 600/176 |
| 6,741,823 B2 | 5/2004 | Yamakama ................... 399/167 |
| 6,831,673 B2 * | 12/2004 | Wakisaka et al. ........... 347/238 |

FOREIGN PATENT DOCUMENTS

| JP | 03-084513 | 4/1991 |
| JP | 2535084 | 5/1997 |
| JP | 2001-194609 | 7/2001 |
| JP | 2001-305456 | 10/2001 |

* cited by examiner

*Primary Examiner*—Loha Ben
(74) *Attorney, Agent, or Firm*—Oblon, Spivak, McClelland, Maier & Neustadt, P.C.

(57) ABSTRACT

An image forming apparatus comprising a lens mounting device in an optical housing. The lens mounting device can prevent the lens mounted on a lens bonding member from being affected by fluctuations in an ambient temperature around the optical housing. The lens is fixed on the lens bonding member through an adhesive layer. The adhesive layer has a thickness of 0.2 mm or above.

17 Claims, 8 Drawing Sheets

LENS MOUNTING DEVICE

BACKGROUND OF THE INVENTION (i) Field of the Invention

The present invention relates to an image forming apparatus such as a copier, printer or facsimile apparatus and, more particularly, to an improved lens mounting device of an optical housing of the image forming apparatus (ii) Description of the Prior Art Generally, an image forming apparatus is provided with a laser beam scanner as an image reading device. It is a common practice with the laser beam scanner to mount an fθ lens as on an optical element on an optical housing which constitutes a part of the laser beam scanner. Various technologies for mounting the lens on the optical housing have been proposed and employed in the conventional laser beam scanners. For example, it is known that the lens is mounted on the optical housing through an adhesive layer if the lens directly comes into contact with the optical housing.

Usually, the optical housing is constructed in a manner as to be sealed, but an ambient temperature around the optical housing intensively varies due to a change in operating conditions of the image forming apparatus, for example, a change in cooling condition in a continuous operation mode or a standby mode in the image forming apparatus. With such a change in ambient temperature, a temperature in the inside of the optical housing also gradually changes to the ambient temperature. A temperature of the optical housing itself intensively fluctuates as compared with a change in the inside temperature of the optical housing because the optical housing is directly exposed to the surrounding environment.

Therefore, an optical element such as an fθ lens which is mounted on the optical housing in a manner as to be partially therewith or partially in contiguity therewith through an adhesive is greatly affected by a change in temperature of the optical housing from the mounting portion and a temperature of the lens locally varies. In such a case, a local distortion occurs in the lens, thereby locally deteriorating the optical characteristics of the lens. As a result, there is a problem that a quality of an image corresponding to the deteriorated portion of the lens, especially a quality of an image which is continuous in a sub-scanning direction is lowered. This problem arises, in particular, when a mold resin is used as a material of the lens or when a material having relatively low specific heat is used for the optical housing.

On the other hand, when an operation of the image forming apparatus is finally stabilized, an ambient temperature around the optical housing, a temperature of the optical housing itself and an inside temperature of the optical housing are also stable. As a result, a local temperature gradient is not generated in the optical element such as an fθ lens, and an image with the excellent quality in the optical characteristics can be obtained. In other words, when an operation mode of the image forming apparatus is changed and an ambient temperature around the optical housing suddenly varies, such a problem arise in particular.

Technologies relating to the present invention are disclosed in, e.g., Japanese Patent Laid-open Publication No. 2001-194609, Japanese Patent Laid-open Publication No. 2001-305456, Japanese Patent No. 2918921 and Japanese Registered Utility Model No. 2535084.

SUMMARY OF THE INVENTION

It is an object of the present invention to provide an image forming apparatus which can prevent from being affected by fluctuations in an ambient temperature around an optical housing so as to obtain a high-grade image.

In accordance with the present invention, there is provided an image forming apparatus which has an image carrier, an optical housing and a scanning lens mounted on the optical housing. The image carrier is scanned by light beams as light spots by the scanning lens. The scanning lens is fixed on a lens bonding member through an adhesive layer. The adhesive layer has a thickness of 0.2 mm or above.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

A description will be first given as to a prior art and its problems prior to explaining the present invention.

Figure 1:
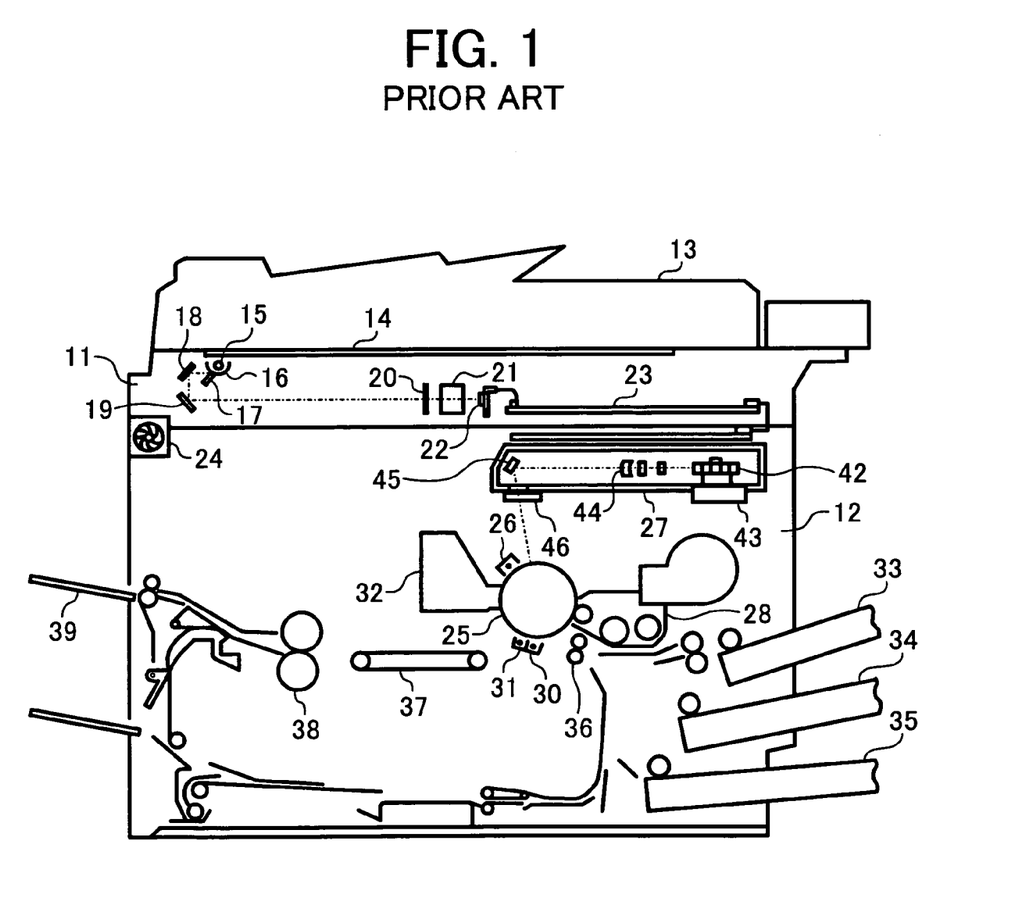
FIG. 1 is a view showing a structure of a prior art digital copying machine as an example of an image forming apparatus.

FIG. 1 shows a structure of a prior art copying machine as an example of the image forming apparatus. The digital copying machine comprises an image reading device 11, a printer 12 having a laser beam scanning device, and an automatic document feeder (ADF) 13.

Figure 2:
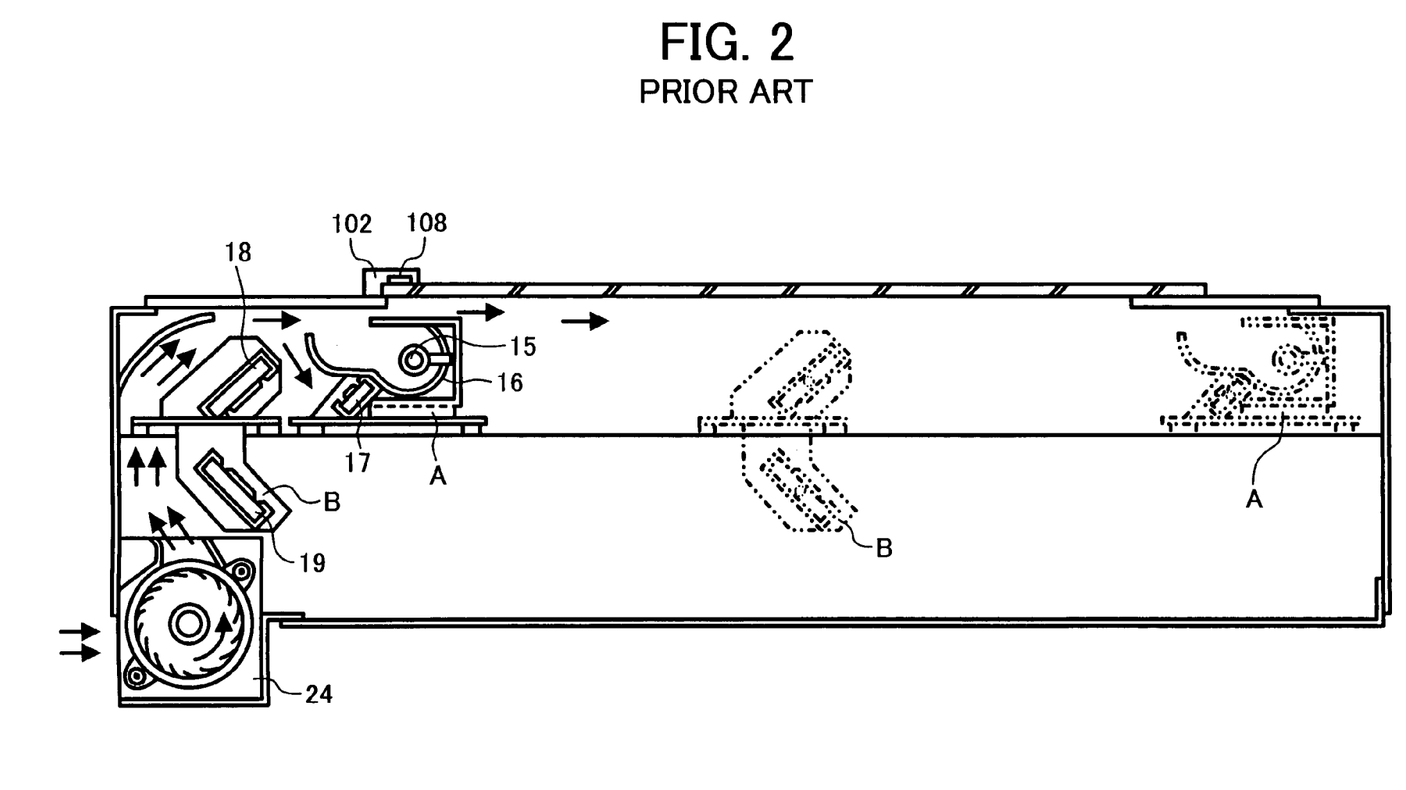
FIG. 2 is a front view showing a structure of an image reading device of the digital copying machine.

The ADF 13 feeds original documents one by one to a contact glass 14 and discharges the original document from the contact glass 14 after copying operation. The image reading device 11 has a first carriage A having a first mirror 17 and a light source including an illumination lamp 15 and a reflection mirror 16, and a second carriage B having a second mirror 18 and a third mirror 19 as shown in FIG. 2. At the time of reading the original document by the reading device, the first carriage A moves at a fixed speed, while the second carriage B following the first carriage A moves at a speed which is ½ of that of the first carriage A. In such a manner, the original document on the contact glass 14 is scanned and illuminated by the illumination lamp 15 and the reflection mirror 16. A reflected light image of the original document is focused on a CCD sensor 22 by a lens 21 through the first mirror 17, the second mirror 18, the third mirror 19 and a color filter 20.

The light image on the CCD sensor 22 is photoelectrically converted and output as an analog image signal. After reading the original document, the first carriage A and the second carriage B return to their home positions. It is to be noted that a color original document can be read by using a three-line CCD including filters of R (red), G (green) and B (blue) as the CCD sensor.

Since the analog image signal from the CCD sensor 22 is converted into a digital image signal by an analog/digital converter, various kinds of image processing such as binarization, maginification and others may be applied to the inside signal by an image processing plate 23.

In copying operation, a photoconductive drum 25 as an image carrier is driven to rotate by a driving device and evenly charged by a charging device 26. The digital image signal processed by the image processing plate 23 is fed to a semiconductor drive plate and an electrostatic latent image is formed on the photoconductive drum 25 by the laser beam scanning device 27 using the digital signal. The electrostatic latent image on a photoconductive drum 25 is developed by a developing device 28.

A paper sheet from one of paper supply devices 33 to 35 is fed through registration rollers 36 to the photoconductive drum 25 and the latent image formed on the photoconductive drum 25 is transferred onto the paper sheet by a transfer device 30. The paper sheet with the image is separated from the photoconductive drum 25 by a separating device 31 and fed by a feeding device 37 to a fixing device 38 wherein the image on the paper sheet is fixed. The paper sheet with the fixed image is from the fixing device 38 onto a tray 39. On the other hand, the photoconductive drum 25 is cleaned by a cleaning device 32 after separating the paper sheet and the residual toner on the photoconductive drum 25 is removed.

Figure 3:
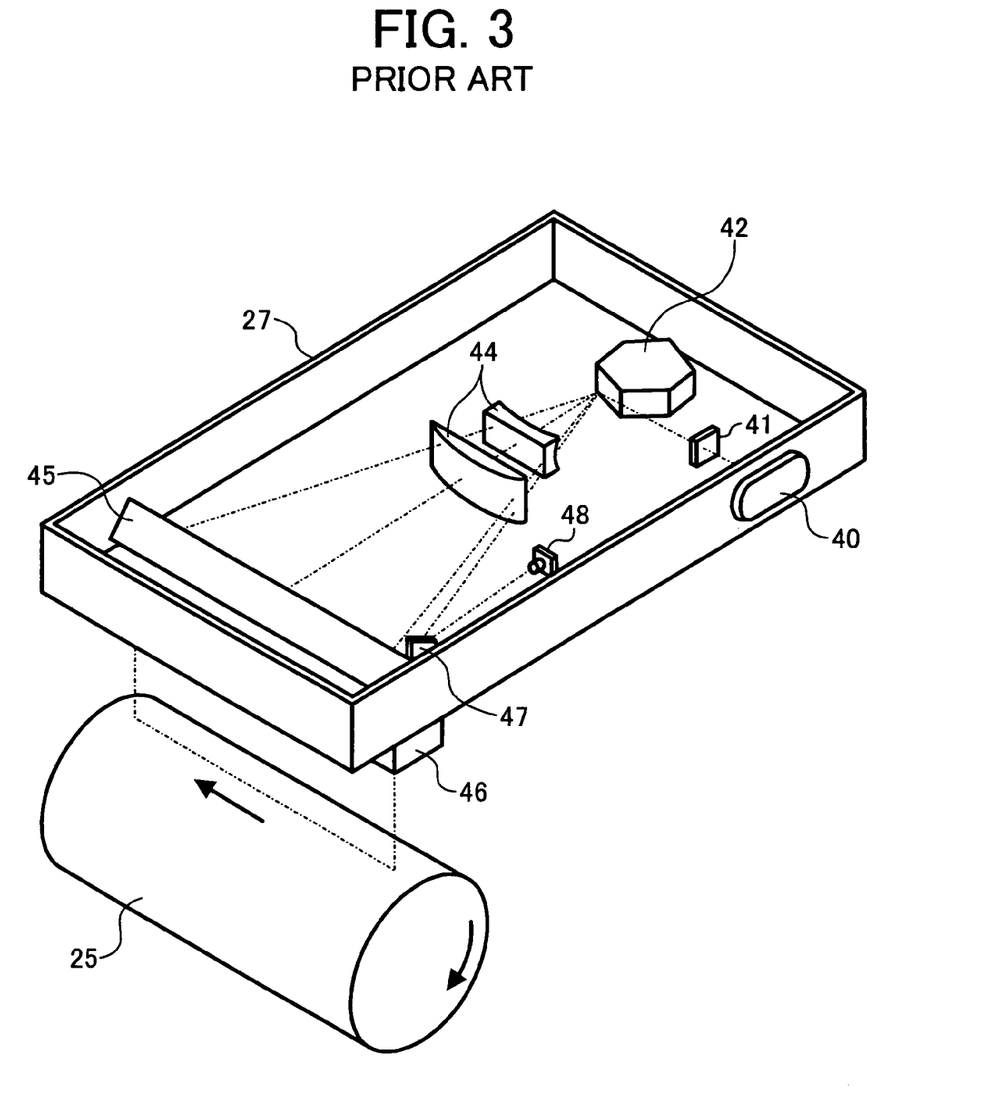
FIG. 3 is a perspective view showing a structure of a laser beam scanning device of the digital copying machine.

As shown in FIG. 3, laser beams emitted from a semiconductor laser in a semiconductor laser unit 40 are converted into parallel light beams by a collimator lens in the semiconductor laser unit 40 and transmitted through an aperture included in the semiconductor laser unit 40. Thereafter, the parallel light beams are shaped and the shaped light beams are compressed in a sub-scanning direction by a cylindrical lens 41 and projected on a polygon mirror 42.

It is to be noted that the polygon mirror 42 has a precise polygonal shape and is driven to rotate in a fixed direction at a fixed speed by a polygon motor 43. A rotational speed of the polygon mirror 42 is determined based on a rotational speed of the photoconductive drum 25, a write density of the laser beam scanning device 27 and the number of surfaces of the polygon mirror 42. The laser beams from the cylindrical lens 41 are deflected by a reflective surface of the polygon mirror 42 and projected on an fθ lens 44.

The fθ lens 44 converts the light beams with a fixed angular speed from the polygon mirror 42 in such a manner that they are scanned at a uniform speed by the photocondutive drum 25, and the light beams from the fθ lens 44 are projected on the photoconductive drum 25 through a reflection mirror 45 and a dust-proof glass 46. Moreover, the fθ lens 44 also has a function to correct an optical face deviation error of the polygon mirror 42. Additionally, the light beams passed through the fθ lens 44 are reflected by a synchronization detection mirror 47 outside an image area, and led to a synchronization detection sensor 48. Then, a synchronization signal as a reference for detecting a leading part in a main scanning direction is obtained by an output of the synchronization detection sensor 48.

In accordance with the prior art digital copying machine as mentioned above, though optical housing mounting an optical element such as the fθ lens 44 of the laser beam scanning device 27 is constructed in a manner as to be sealed, ambient temperature around the optical housing intensively varies due to a change inn operating conditions of the image forming apparatus. Therefore, with such a change in ambient temperature, a temperature of the optical housing itself also gradually changes to the ambient temperature. Since a temperature of the optical housing itself changes, a temperature in the inside of the optical housing also gradually varies. In addition, the optical element such as the fθ lens 44 in the optical housing is also greatly affected by the change in temperature, and a local distortion is generated in the lens 44, thereby locally deteriorating optical characteristics of the lens. As a result, there is a problem that an height corresponding to this degraded portion is largely lowered.

Embodiments according to the present invention which can solve the problems in the prior art will now be described in detail hereinafter with reference to the accompanying drawings.

Figure 4:
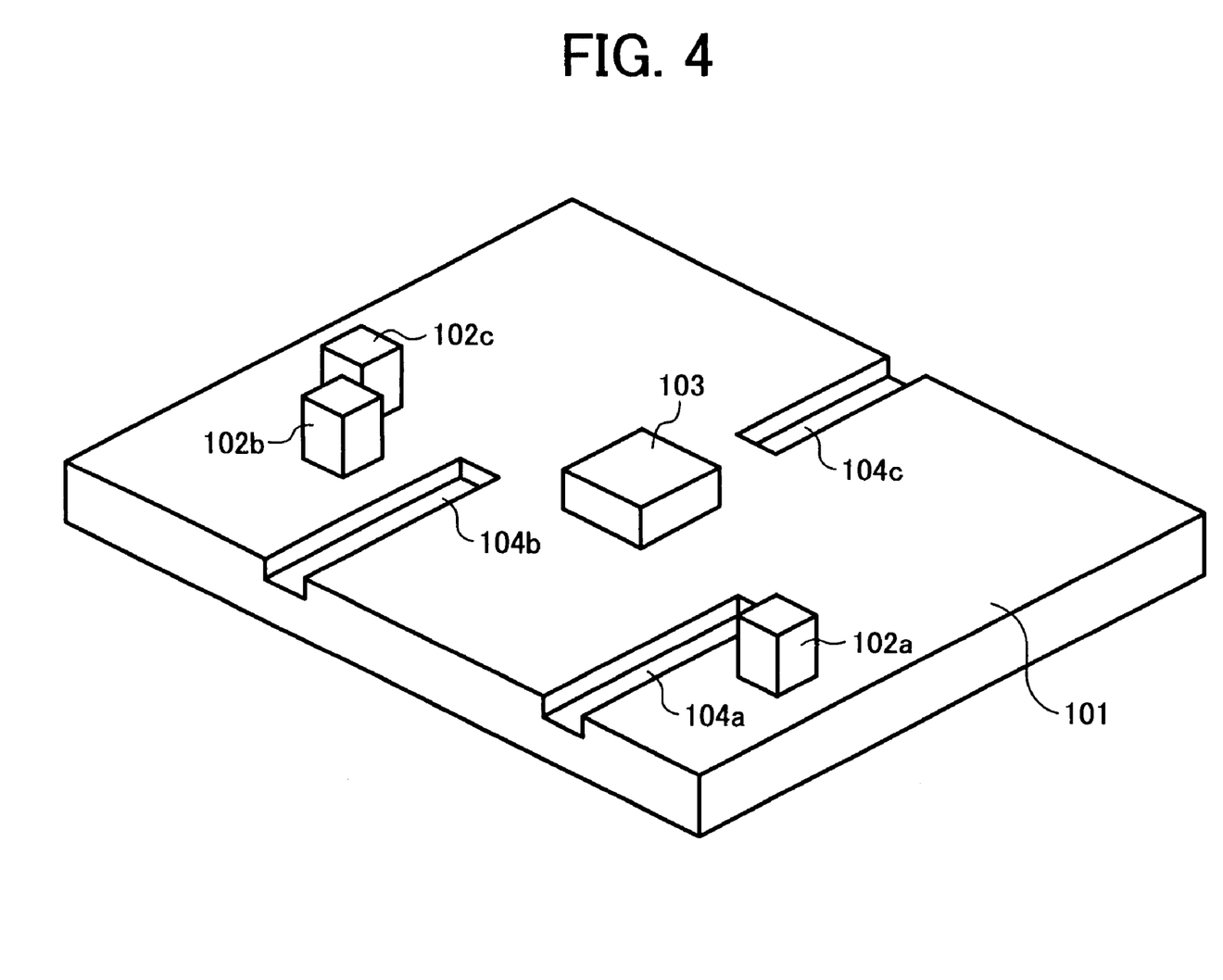
FIG. 4 is a perspective view showing a lens mounting device of an optical housing according to a first embodiment of the present invention.

FIG. 4 shows a structure of a lens mounting device of an optical housing according to a first embodiment of the present invention. As shown, the lens mounting device includes a base 101 on which are provided with lens positioning bosses 102a, 102b and 102c which protrude from the base 101, jig setting grooves 104a, 104b and 104c, and a lens bonding member 103 provided between the jig setting grooves 104a, 104b and 104c. Bottom surfaces of the jig setting grooves 104a, 104b and 104c are accurately finished as jig setting reference surfaces.

Figure 5:
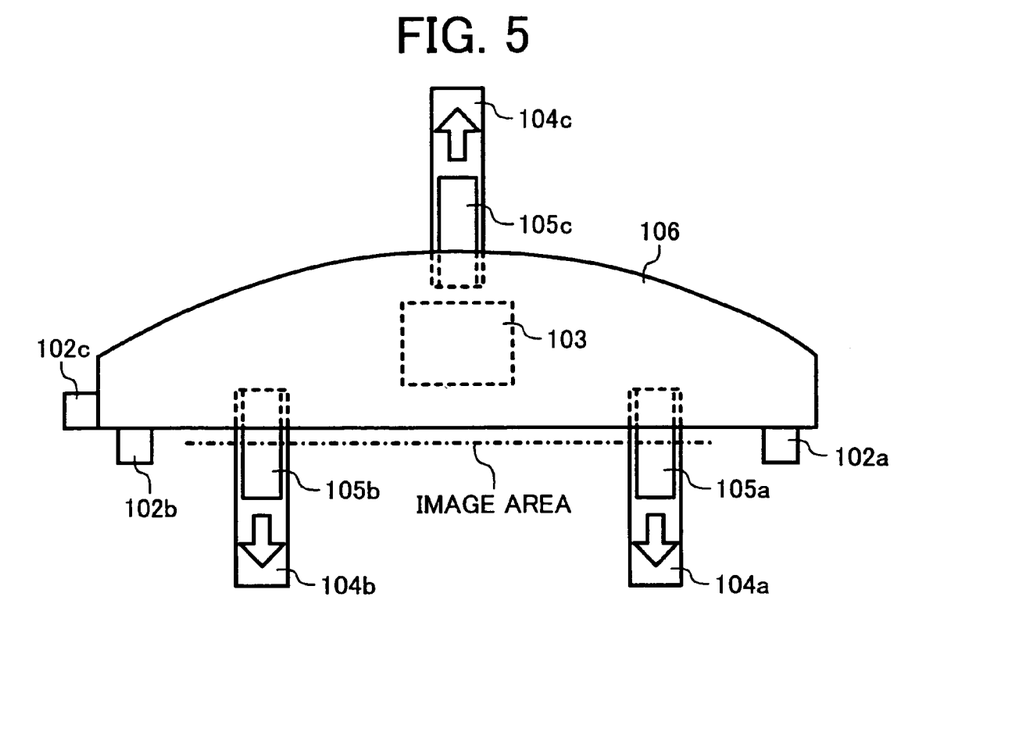
FIG. 5 is a plane view showing a lens mounted on the optical housing.
Figure 6:
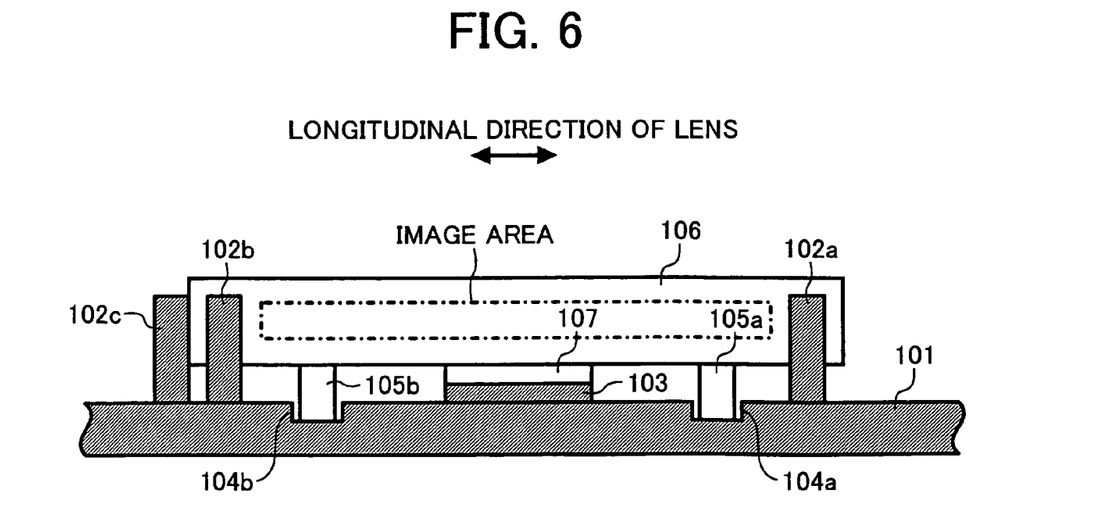
FIG. 6 is a cross-sectional view showing the lens mounted on the optical housing.

As shown in FIGS. 5 and 6, rectangular parallelepiped spacers 105a, 105b and 105c are inserted into the jig setting grooves 104a, 104b and 104c of the base 101. Upper surfaces and lower surfaces of these spacers 105a, 105b and 105c are accurately finished. After applying an ultraviolet (UV) cured resin 107 on the lens bonding member 103, the lens is mounted thereon.

A scanning lens 106 is positioned in a plane direction in the drawing by being brought into contact with the bosses 102a, 102b and 102c protruding from the base 101 provided outside an image area of the scanning lens 106. Further, the scanning lens 106 is positioned in a height direction by the spacers 105a, 105b and 105c. Since a surface of the scanning lens 106 which is in contact with the spacers 105a, 105b and 105c is an accurate reference surface, the scanning lens 106 is accurately positioned in the height direction.

As described above, with the scanning lens 106 being positioned in the plane direction and the height direction, the UV ray are irradiated on the UV cured resin 107 so as to bond the scanning lens 106 to the bonding member 103.

Thus, the scanning lens 106 bonded on the bonding member 103 is fixed thereon at a position in the vicinity of the center of the scanning lens 106 in a lower part in the image area of the lens 106. The heights of the spacers 105a, 105b and 105c, the jig setting reference surfaces of the jig setting grooves 104a, 104b and 104c and the lens bonding member 103 are set in such a manner that a thickness of an adhesive layer on the lens bonding member 103, i.e., a thickness of the UV cured resin 107 becomes 0.2 mm.

Figure 7:
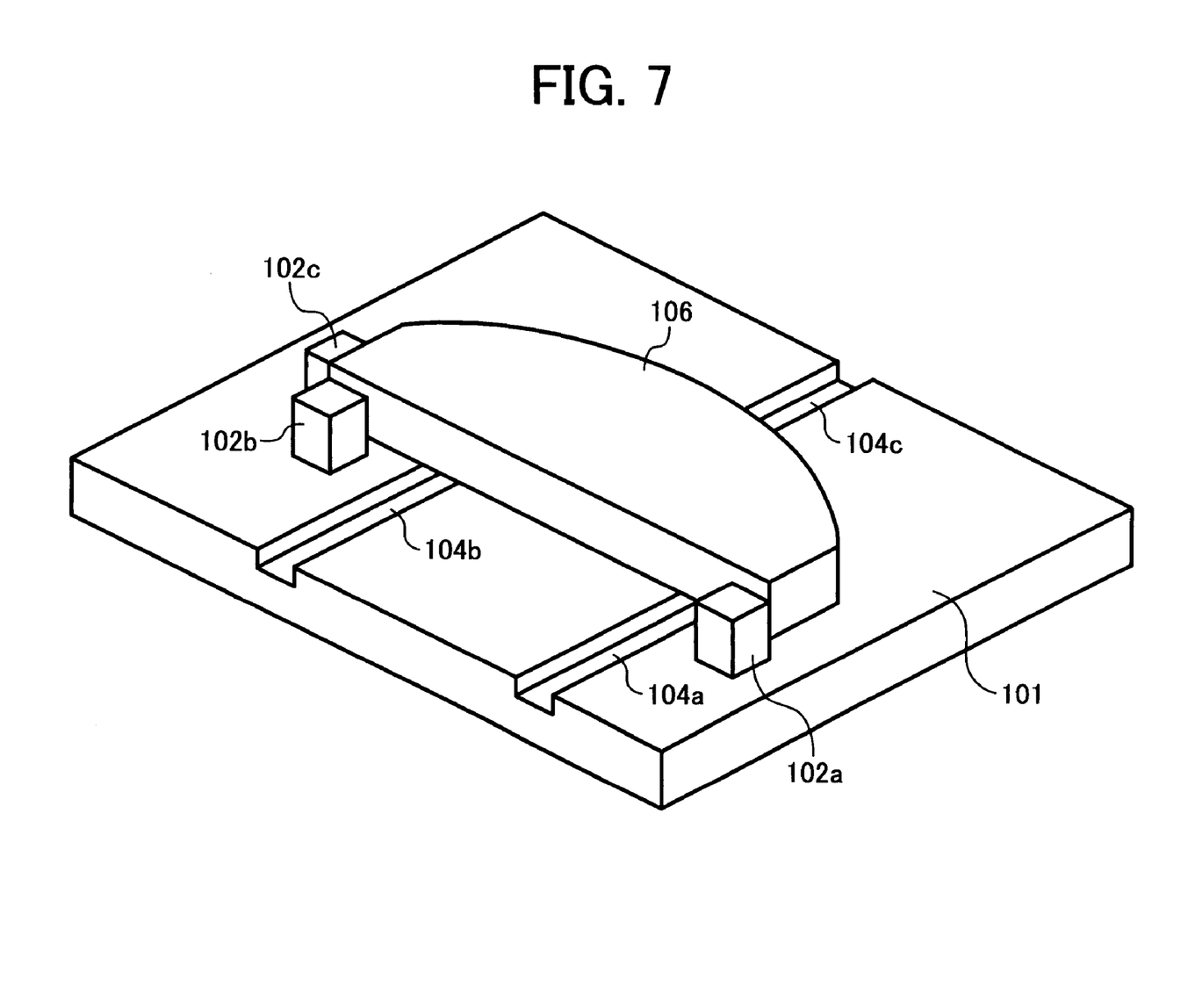
FIG. 7 is a perspective view showing a lens mounted on the optical housing after pulling out spacers.

After bonding the scanning lens 106 on the bonding member 103, the spacers 105a, 105b and 105c are pulled out in directions indicated by arrows in FIG. 5, and the scanning lens 106 is held and fixed on the bonding member 103 by an adhesive layer 107 of the UV cured resin 107 having a thickness of 0.2 mm or above in the vicinity of the center of the lens. FIG. 7 shows a lens fixed on the bonding member 103 after pulling out the spacers 105a, 105b and 105c in the fist embodiment of the invention.

In accordance with this embodiment, since the thickness of the adhesive layer 107 is 0.2 mm or above and the scanning lens 106 is not directly contact with the base 101 in an image forming area of the lens 106, a change in temperature of the base 101 may not be transferred to the scanning lens 106 and a local change in temperature of the scanning lens 106 may not occur.

Therefore, this embodiment can solve the problems of the prior art, i.e., a degradation in the optical characteristics caused by an internal distortion due to a local change in temperature of the scanning lens 106 and a deterioration of an output image from the scanning lens 106.

Further, since the reference surfaces for setting the spacers 105a, 105b and 105c are provided to the scanning lens 106 and the bonded member 103 on the base 101, the scanning lens 106 may be accurately positioned even if the spacers 105a, 105b and 105c are interposed for positioning the lens 106 in the lens height direction.

Furthermore, since a lens bonding position is arranged between the reference surfaces, the height changes are equally provided at positions where the lens 106 comes into contact with the spacers 105a, 105b and 105c even if the thickness of the adhesive layer 107 changes due to hardening of the adhesive layer 107.

Moreover, since the spacers 105a, 105b and 105c used as jigs can be removed after bonding the scanning lens 106, a metal can be used as a material of the jigs so that the number of components for the lens mounting device of the optical housing can be reduced.

Figure 8:
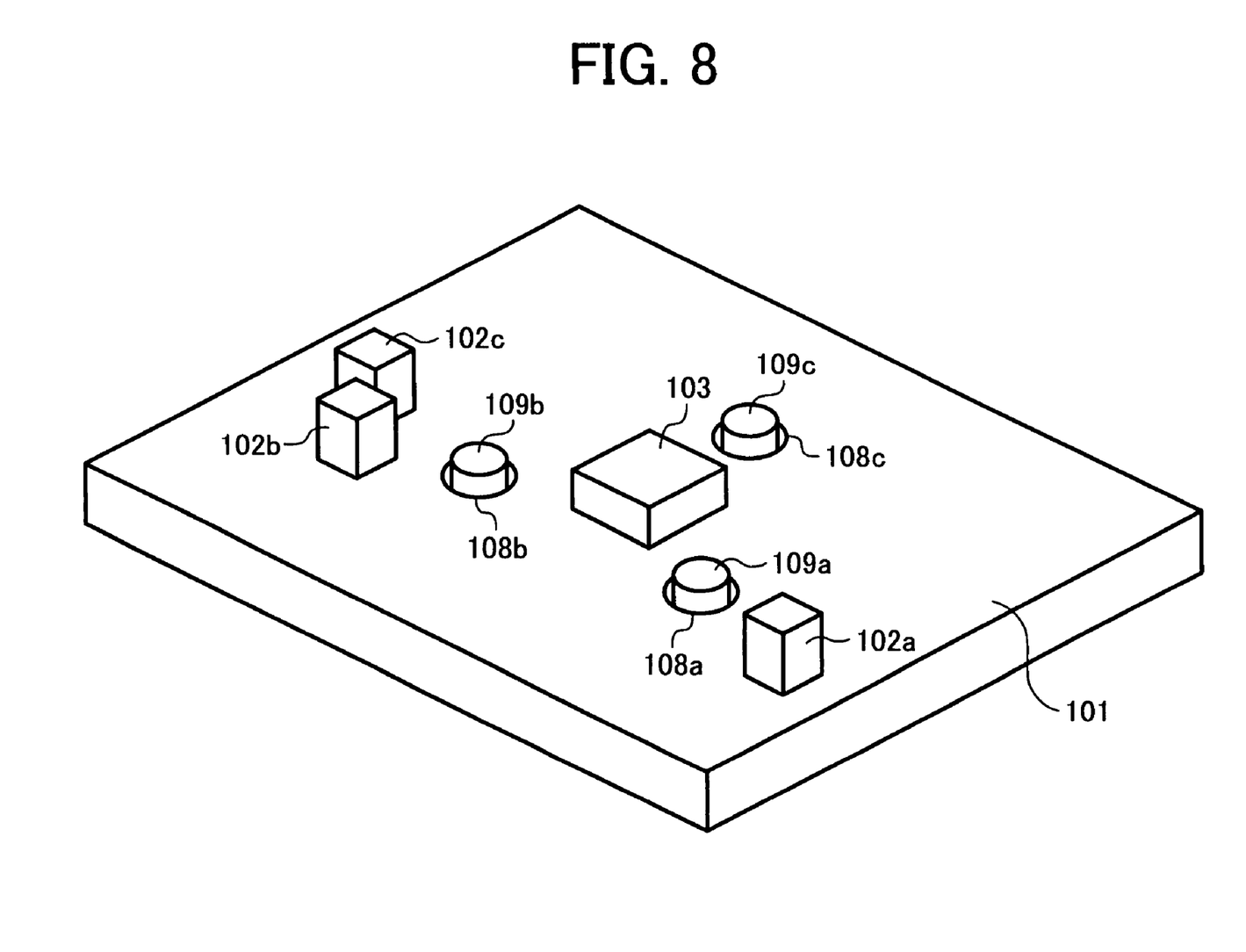
FIG. 8 is a perspective view showing a lens mounting device of an optical housing according to a second embodiment of the present invention.

FIG. 8 shows a structure of a lens mounting device of an optical housing according to a second embodiment of the present invention. As shown, the lens mounting device includes a base on which are provided lens positioning bosses 102a, 102b and 102c protruding from the base 101, jig setting grooves (holes) 108a, 108b and 108c, and a lens bonding member 103 provided between the jig setting grooves 108a, 108b and 108c. Bottom surfaces of the jig setting grooves 108a, 108b and 108c are accurately finished as jig setting reference surfaces.

Spacers 109a, 109b and 109c are set in the jig setting grooves 108a, 108b and 108c. The spacers 109a, 109b and 109c may be made of a material having a thermal conductivity lower than that of the base 101.

Figure 9:
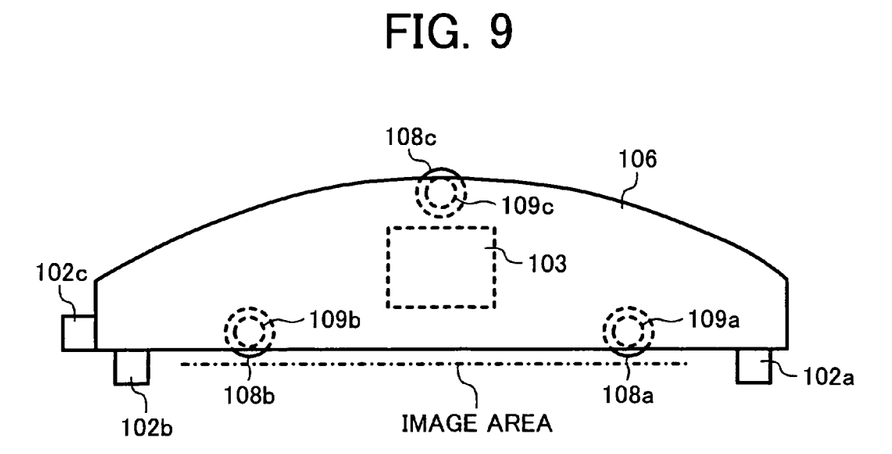
FIG. 9 is a plane view showing a lens mounted on the optical housing.
Figure 10:
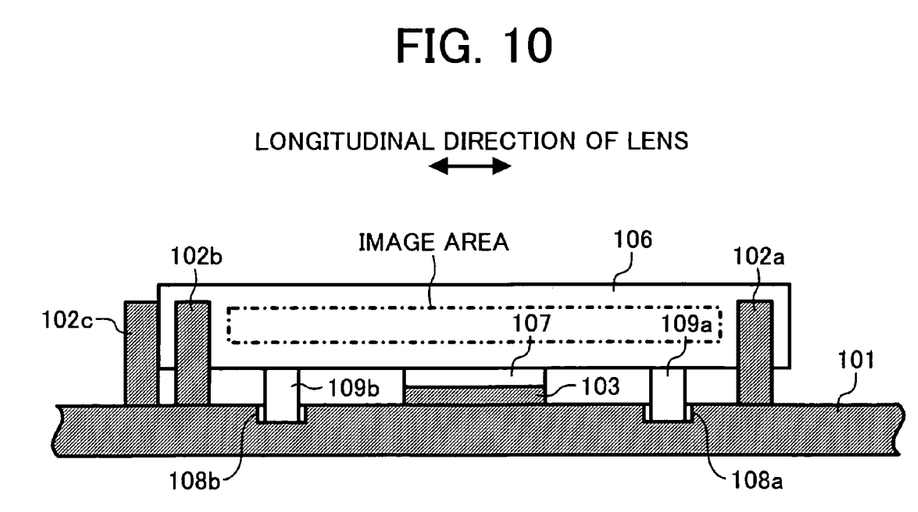
FIG. 10 is a cross-sectional view showing the lens mounted on the optical housing.

In accordance with the second embodiment, as shown in FIGS. 9 and 10, after applying a UV cured resin 107 on the lens bonding member 103 having a flat upper surface, a scanning lens 106 mounted thereon. The scanning lens 106 is positioned in the plane direction in the drawing by being brought into contact with the bosses 102a, 102b and 102c protruding from the base 101 provided outside an image area of the scanning lens 106. Further, the scanning lens 106 is positioned in the height direction by the spacers 109a, 109b and 109c. Since a surface of the scanning lens 106 which is in contact with the spacers 109a, 109b and 109c is an accurate reference surface, the scanning lens 106 is accurately arranged in the height direction.

As described above, with the scanning lens 106 being positioned in the plane direction and the height direction, the UV rays are irradiated on the UV cured resin 107 so as to bond the scanning lens 106 to the bonding member 103.

Thus, the scanning lens 106 bonded on the bonding member 103 is fixed thereon at a position in the vicinity of the center of the scanning lens 106 in a lower part of the image area of the lens 106. The heights of the spacers 109a, 109b and 109c, the jig setting grooves 108a, 108b and 108c and the lens bonding member 130 are set in such a manner that a thickness of an adhesive layer on the lens bonding member 103, i.e., a thickness of the UV cured resin 107 becomes 0.2 mm or above.

Although the spacers 109a, 109b and 109c are left in the base 101 of the lens bonding device after bonding the scanning lens 106, a restraint in the upper-and-lower direction is imposed on the spacers 109a, 109b and 109c by the scanning lens 106 held and fixed on the bonding member 106 through the adhesive layer 107. Furthermore, since each of gaps between the spacers 109a, 109b and 109c and the jig setting grooves 108a, 108b and 108c, respectively, is set small, the spacers 109a, 109b and 109c do not come off nor greatly move due to vibrations of the base 101 and the like.

In accordance with this embodiment, since the thickness of the adhesive layer 107 is 0.2 mm or above and the scanning lens 106 is not directly fixed to the base 101, a change in temperature of the base 101 may not be transferred to the scanning lens 106 and a local change in temperature of the scanning lens 106 may not occur. Therefore, this embodiment can also solve problems of the prior art, i.e., a degradation in the optical characteristics caused by an internal distortion due to a local change in temperature of the scanning lens 106 and a deterioration of an output image from the scanning lens 106.

Moreover, since the reference surfaces used for setting the spacers 109a, 109b and 109c are provided to the scanning lens 106 and the bonding member 103 on base 101, the scanning lens 106 may be accurately positioned even if the spacers 109a, 109b and 109c are interposed for positioning the lens 106 in the lens height direction.

Additionally, since a lens bonding position is arranged between the reference surfaces, the height changes are equally provided at positions where the lens 106 come into contact with spacers 109a, 109b and 109c even if the thickness of the adhesive layer 107 changes due to hardening of the adhesive layer 107. The spacers 109a, 109b and 109c of the embodiment are left in the base 101 of the optical housing and have reference surfaces such that the spacers 109a, 109b and 109c do not come off nor greatly move due to vibrations of the base 101 and the like, a light path may not be obstructed when the spacers 109a, 109b and 109c come off.

Further, since a thermal conductivity of the spacers 109a, 109b and 109c is lower than that of the base 101, a local change in temperature may not occur in the scanning lens 106. Therefore, this embodiment can solve the problems of the prior art, as mentioned above. Moreover, since the spacers 109a, 109b and 109c are not use as jigs, troubles of setting the jigs and removing them after bonding can be saved and the setting of assembling steps may be simplified.

Various modifications will become possible for those skilled in the art after receiving the teachings of the present disclosure without departing from the scope thereof.

What is claimed is:

1. A lens mounting device for an optical housing comprising:

a base;

a lens bonding member provided on said base;

an adhesive layer applied to said lens bonding member; and a scanning lens mounted on said lens bonding member by said adhesive layer, wherein said adhesive layer has a thickness of 0.2 mm or above, and said scanning lens is bonded and fixed to said lens bonding member at one position in a vicinity of a center of said scanning lens.

2. An image forming apparatus comprising:
an image carrier;
an optical housing; and
a scanning lens provided on said optical housing,
wherein said image carrier is scanned by light beams as light spots by said scanning lens, said scanning lens is fixed on a lens bonding member by an adhesive layer, said adhesive layer has a thickness of 0.2 mm or above, and said scanning lens is bonded and fixed to said lens bonding member at one position in a vicinity of a center of said scanning lens.

3. An image forming apparatus comprising:
an image carrier;
an optical housing;
a scanning lens provided on said optical housing; and
reference surfaces provided to the scanning lens and a lens bonding member configured to set spacers which ensure that a distance between the scanning lens and said lens bonding member is 0.2 mm or above at a time of bonding the scanning lens on said lens bonding member,
wherein said image carrier is scanned by light beams as light spots by said scanning lens, said scanning lens is fixed on said lens bonding member by an adhesive layer, and said adhesive layer has a thickness of 0.2 mm or above.

4. The image forming apparatus as claimed in claim 3, wherein a bonding position is provided between said reference surfaces of the scanning lens and said lens bonding member.

5. The image forming apparatus as claimed in claim 3, wherein the spacers function as jigs and have reference surfaces by which the spacers can be removed after bonding the scanning lens on said lens bonding member.

6. The image forming apparatus as claimed in claim 3, wherein the spacers have reference surfaces which ensure fixing positions.

7. The image forming apparatus as claimed in claim 6, wherein a thermal conductivity of a material of said spacers is lower than that of said lens bonding member.

8. A method for bonding a scanning lens to a base, comprising:
providing a base including a lens bonding member, at least one lens positioning boss, and at least one jig setting groove;
inserting a spacer into the at least one jig setting groove;
applying an adhesive to the lens bonding member;
positioning a scanning lens with said at least one positioning boss and the spacer on the adhesive on the lens bonding member; and
curing the adhesive.

9. The method recited in claim 8, wherein the applying an adhesive to the lens bonding member includes applying an ultraviolet cured resin to the lens bonding member.

10. The method recited in claim 9, wherein the curing the adhesive includes curing the adhesive by irradiating the adhesive with ultraviolet rays.

11. The method recited in claim 8, further comprising:
removing the spacer from the at least one jig setting groove.

12. The method recited in claim 8, wherein the inserting a spacer into the at least one jig setting groove includes inserting one spacer into each of three jig setting grooves.

13. The method recited in claim 8, wherein the applying an adhesive to the lens bonding member includes applying a layer of adhesive with a thickness of at least 0.2 mm to the lens bonding member.

14. The method recited in claim 8, wherein the inserting a spacer into the at least one jig setting groove includes inserting a spacer having a parallelepiped shape into the at least one jig setting groove.

15. The method recited in claim 8, wherein the inserting a spacer into the at least one jig setting groove includes inserting a spacer having a cylindrical shape into the at least one jig setting groove.

16. The method recited in claim 8, wherein the inserting a spacer into the at least one jig setting groove includes inserting a spacer having a thermal conductivity less than a thermal conductivity of the lens bonding member into the at least one jig setting groove.

17. The method recited in claim 8, wherein the positioning a scanning lens with said at least one positioning boss and the spacer on the adhesive on the lens bonding member includes positioning a scanning lens to contact the adhesive on the lens bonding member at one position in a vicinity of a center of the scanning lens.

* * * * *